Aug. 22, 1933.  J. F. VERA  1,923,647

LOCK BOLT, NUT, OR SCREW

Filed March 18, 1931

Inventor
John F. Vera
By Arthur Wm Nelson
Attorney

Patented Aug. 22, 1933

1,923,647

UNITED STATES PATENT OFFICE 1,923,647

LOCK BOLT, NUT, OR SCREW

John F. Vera, Chicago, Ill., assignor of one-third to Howard H. Osborn, and one-third to Allen W. Mathis, Chicago, Ill.

Application March 18, 1931. Serial No. 523,483

3 Claims. (Cl. 151—37)

This invention relates to improvements in lock bolts, nuts or screws and it consists of the matters hereinafter described and more particularly pointed out in the appended claims.

The primary object of the invention is to provide a device associated with a screw threaded shank or the like, which when drawn up tight prevents reverse turning thereof with resulting loosening.

A further object of the invention is to provide a lock bolt or screw having a head with the bottom of which is associated an axially resilient unslit flange provided with teeth on the undersurface thereof, which when the bolt or screw is tightly drawn up, bites into the member with which the bolt or screw is used to prevent it from turning in a direction which would loosen the same.

The above mentioned objects of the invention as well as others, together with the many advantages thereof, will more fully appear as I proceed with my specification.

In the drawing:—

Figure 1:
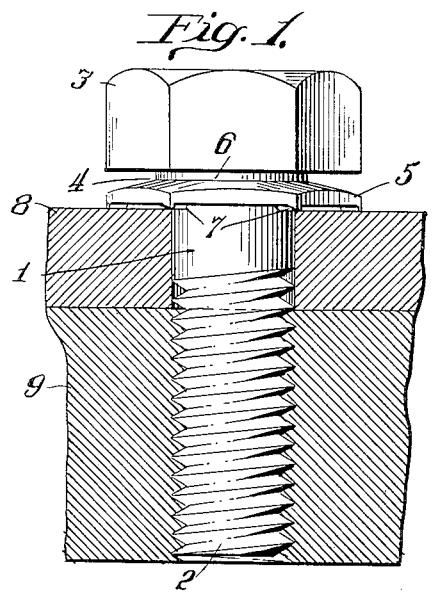
Fig. 1 is a view in side elevation of a lock bolt embodying my invention with the flexible flange thereof just about engaging with one of the parts secured together by the bolt.
Figure 2:
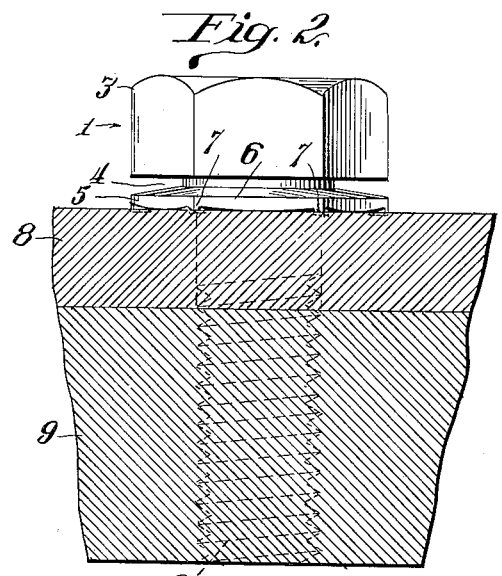
Fig. 2 is a view somewhat similar to Fig. 1 after the bolt has been drawn up tight and the flange thereof has been somewhat flattened out.
Figure 3:
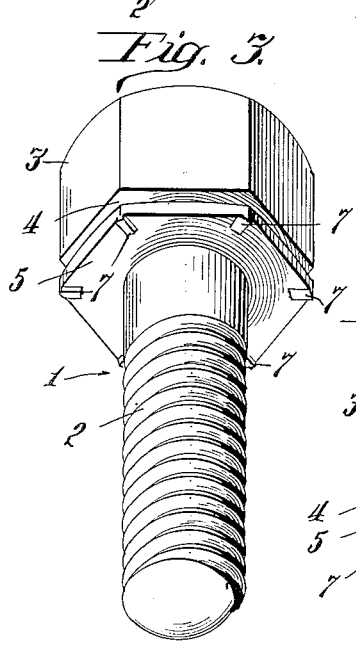
Fig. 3 is a perspective view of the bolt shown in Figs. 1 and 2.

Referring now in detail to that embodiment of the invention illustrated in the accompanying drawing and especially to Figs. 1, 2 and 3 thereof, 1 indicates as a whole a bolt which includes a threaded shank 2 and the usual hexagonal head 3. Just below the head and spaced therefrom by an annular groove 4 is a resilient flange 5 of the same outline as the head and connected thereto by a neck 6 of a diameter approximating that of the shank. The flange 5 is of a less thickness at its periphery than it is where it joins the shank so that it is capable of yielding with a springing action in the direction of the length of the bolt as a whole.

Spaced at suitable arcuate distances apart on the underside of said flange and preferably at each corner thereof, is a relatively sharp tooth 7 in the form of a ratchet tooth which faces in a direction opposite that in which the bolt is turned to tighten the same.

When a bolt of this kind is employed to secure two coacting machine or other parts 8 and 9 together as shown in Figs. 1 and 2, a turning of the bolt in the proper direction will cause the head to approach the part 8 and will bring the teeth 7 on the flange thereof, into engagement with the top surface of said part. When the bolt is further tightened, this will cause the flange to move into a closer engagement and will cause the flange to yield or spring and thus dig the teeth 7 thereof, into the top surface of the part 8. This imposes a tension on said flange which when the bolt seeks to turn in a reverse direction, ably resists such turning and thus locks the bolt in place.

It will be apparent that because of the continuous contour of the flange 5, 5a, and the several embodiments of the invention and its initially dished form, screwing of the parts to tight position causes not only an upward bending or flexure of the flange itself and in contact with the body head 3, 3a, but also a physical stretching of the material of the flange at and adjacent its periphery into the larger diameter necessarily accompanying removal of the dish. This action provides enormous spring pressure on the teeth 7, 7a, causing them to bite sharply into the metal of the presented part. The rachet shape of these teeth permits tightening of the bolt or nut. Effort to unscrew the parts causes the teeth to resist in the direction of the circumferential internal tension of the flange, i. e. to augment the tensile forces created in the flange in the tightening of the parts.

Figure 4:
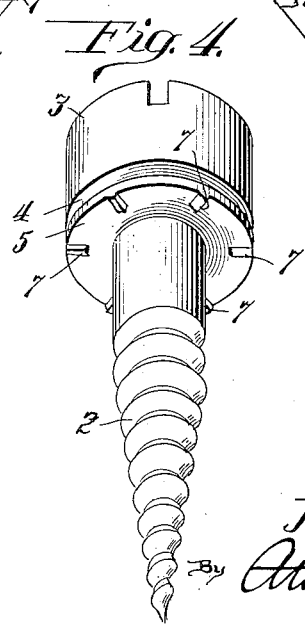

In Fig. 4, I have illustrated the invention as embodied in a screw wherein like parts bear reference numerals similar to those used in Figs. 1, 2 and 3. The operation of such a screw is apparent from the foregoing.

Figure 5:
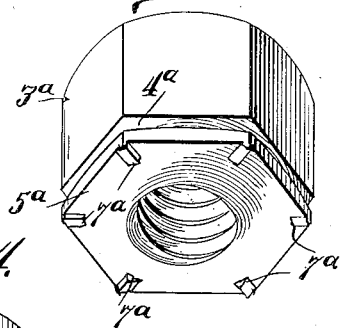
Fig. 4 is a perspective view of a screw embodying the invention and Fig. 5 is a perspective view of a nut embodying the invention.

In Fig. 5 I have shown the invention as embodied in a hexangular nut 3a which is provided at its bottom with a flange 5a, spaced from the head by an annular groove 4a. This flange has the same outline shape as the nut and is provided at each of its corners with a tooth 7a similar to the teeth before mentioned. When such a nut is drawn up tight upon a bolt, the said teeth will bite into the part through which the bolt extends and with the flange 5a under tension, said teeth will prevent the nut from turning in the reverse direction.

A structure made as described is indeed effective in preventing reverse turning of the bolt screw or nut in which it is embodied, under vibration imparted thereto. Such a bolt or nut eliminates the use of the usual spring lock or ordinary washers and also does away with the time required to apply such washers in place.

While in describing the invention, I have referred in detail to the form and arrangement of the parts thereof, the same is to be considered merely as illustrative, so that I do not wish to be limited thereto, except as may be specifically set forth in the appended claims.

I claim as my invention:—

1. A device of the kind described, embodying a nut like body having an integral continuous dished resilient flange spaced from the bottom thereof and provided with teeth on its underface, said flange being enlarged at its periphery when the nut like body is screwed home to remove the dish with resulting internal tensile stresses to press the teeth into a presented surface.

2. A device of the kind described, embodying a nut like body having an integral continuous dished resilient flange spaced from the bottom thereof and provided with teeth on its underface, said flange being enlarged at its periphery when the nut like body is screwed home to remove the dish with resulting internal tensile stresses to press the teeth into a presented surface, said teeth being of ratchet form to engage the metal in an unscrewing operation to increase said tensile stresses.

3. A device of the kind described, comprising a head adapted to be drawn tight against an engaged part and having an integral continuous dished resilient flange spaced from said head and provided with teeth on its under surface, said flange being enlarged at its periphery as the parts are brought to final position to remove the dish with resultant interior tensile stress to press the teeth into a presented surface.

JOHN F. VERA.